United States Patent
Kawamoto

(10) Patent No.: US 9,065,815 B2
(45) Date of Patent: Jun. 23, 2015

(54) COMPUTER SYSTEM, CONTROLLER, AND METHOD OF CONTROLLING NETWORK ACCESS POLICY

(75) Inventor: Masaya Kawamoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/110,917

(22) PCT Filed: Apr. 6, 2012

(86) PCT No.: PCT/JP2012/059471
§ 371 (c)(1),
(2), (4) Date: Oct. 9, 2013

(87) PCT Pub. No.: WO2012/141086
PCT Pub. Date: Oct. 18, 2012

(65) Prior Publication Data
US 2014/0033275 A1    Jan. 30, 2014

(30) Foreign Application Priority Data
Apr. 15, 2011    (JP) ................................ 2011-091105

(51) Int. Cl.
*H04L 29/06*    (2006.01)
*H04L 12/911*    (2013.01)
*H04L 12/721*    (2013.01)

(52) U.S. Cl.
CPC .............. *H04L 63/08* (2013.01); *H04L 63/102* (2013.01); *H04L 63/123* (2013.01); *H04L 63/162* (2013.01); *H04L 45/38* (2013.01); *H04L 47/70* (2013.01)

(58) Field of Classification Search
CPC .................................................... H04L 63/162
USPC ........................................................... 726/3
See application file for complete search history.

(56) References Cited

U.S. PATENT DOCUMENTS

| | | | | |
|---|---|---|---|---|
| 6,141,755 A | * | 10/2000 | Dowd et al. | 726/11 |
| 8,462,630 B2 | * | 6/2013 | Samuels et al. | 370/235 |

(Continued)

FOREIGN PATENT DOCUMENTS

| | | |
|---|---|---|
| JP | 2005-004549 A | 1/2005 |
| WO | WO 2011/030490 A1 | 3/2011 |
| WO | WO 2011/037105 A1 | 3/2011 |

OTHER PUBLICATIONS

English translation of PCT/ISA/237 (written opinion of the international searching authority, dated Jun. 26, 2012).

(Continued)

*Primary Examiner* — Techane Gergiso
(74) *Attorney, Agent, or Firm* — McGinn IP Law Group, PLLC

(57) ABSTRACT

A computer system according to the present invention includes a controller, and a switch which carries out a relay operation on a received packet which conforms to a flow entry which is set by the controller, the relay operation being regulated with the flow entry. The switch transmits a received packet which does not conform to the flow entry which is set by the switch to the controller. The controller queries authentication information which is included in the received packet and authenticates the received packet. From among the header information of the received packet which is determined to be valid, the controller sets the switch to the flow entry which regulated the relay operation for the packet which includes information which identifies the transmission source of the received packet. Network access policy control in a computer system of an open flow protocol environment is thus made easy.

9 Claims, 8 Drawing Sheets

(56) References Cited

U.S. PATENT DOCUMENTS

| | | | |
|---|---|---|---|
| 2007/0044141 A1* | 2/2007 | Lor et al. | 726/3 |
| 2008/0189769 A1* | 8/2008 | Casado et al. | 726/4 |
| 2010/0232294 A1* | 9/2010 | Samuels et al. | 370/235 |
| 2011/0058549 A1* | 3/2011 | Harel et al. | 370/390 |
| 2011/0280213 A1* | 11/2011 | Calhoun et al. | 370/331 |

OTHER PUBLICATIONS

PCT/IB/373 dated Oct. 15, 2013.

International Search Report in PCT/JP2012/059471 dated Jun. 26, 2012 (English Translation Thereof).

OpenFlow Switch Specification Version 1.0.0 (Wire Protocol 0×01) Dec. 31, 2009, Internet (URL:http://www.openflowswitch.org/documents/openflow-spec-v1.0.0.pdf).

Martin Casado et al, Ethane: Taking Control of the Enterprise, ACM SIGCOMM Computer Communication Review, vol. 37, Issue 4, Oct. 2007, p. 1-12, p. 3 [2.2 Ethane in USE]—P.6 [3.3 Controller].

Open Flow Switch Specification Version 1.1.0 Implemented (Wire Protocol 0×02) Feb. 28, 2011, pp. 1-56.

Extended European Search Report dated Nov. 4, 2014.

Martin Casado, et al., "Ethane: Taking Control of the Enterprise", SIGCOMM Computer Communication Review, ACM, Oct. 2007, vol. 37, Issue 4, pp. 1-12.

Japanese Office Action dated Aug. 19, 2014 with an English translation thereof.

* cited by examiner

Fig. 4

| | | |
|---|---|---|
| 131 | POLICY ID | POLICY FOR GENERAL STAFF OF ACCOUNTING DIVISION |
| 132 | AUTHENTICATION ID | XXXXX |
| 133 | POLICY 1 | HTTP CONNECTION TO 10,11,12,1 IS ALLOWED. PRIORITY IS 10. |
| | POLICY 2 | FTP CONNECTION TO 10.11.12.2 IS ALLOWED. PRIORITY IS 20. |
| | POLICY 3 | RDP CONNECTION FROM 10.11.12.0/24 IS ALLOWED. PRIORITY IS 30. |
| | | |

Fig. 5A

| RULE | | ACTION INFORMATION |
|---|---|---|
| Match Field | Match Value | |
| input Port | 0/1 | Action: OUTPUT<br>Send to port : 0/2<br><br><br><br>Priority: 10 |
| src mac address | MAC ADDRESS OF TERMINAL A | |
| dst mac address | ANY | |
| input VLAN ID | VLAN ID OF TERMINAL A | |
| input VLAN Priorty | ANY | |
| ether type | 0X0800 | |
| tos/dscp | ANY | |
| IP Protocol | 6 | |
| src IP address | ADDRESS OF TERMINAL A | |
| dst IP address | 10.11.12.1 | |
| src port | ANY | |
| dst port | 80 | |

Fig. 5B

| RULE | | ACTION INFORMATION |
|---|---|---|
| Match Field | Match Value | |
| input Port | 0/2 | Action: OUTPUT Send to port:0/1

Priority: 10 |
| src mac address | ANY | |
| dst mac address | MAC ADDRESS OF TERMINAL A | |
| input VLAN ID | ANY | |
| input VLAN Priorty | ANY | |
| ether type | 0X0800 | |
| tos/dscp | ANY | |
| IP Protocol | 6 | |
| src IP address | 10.11.12.1 | |
| dst IP address | IP ADDRESS OF TERMINAL A | |
| dst port | 80 | |

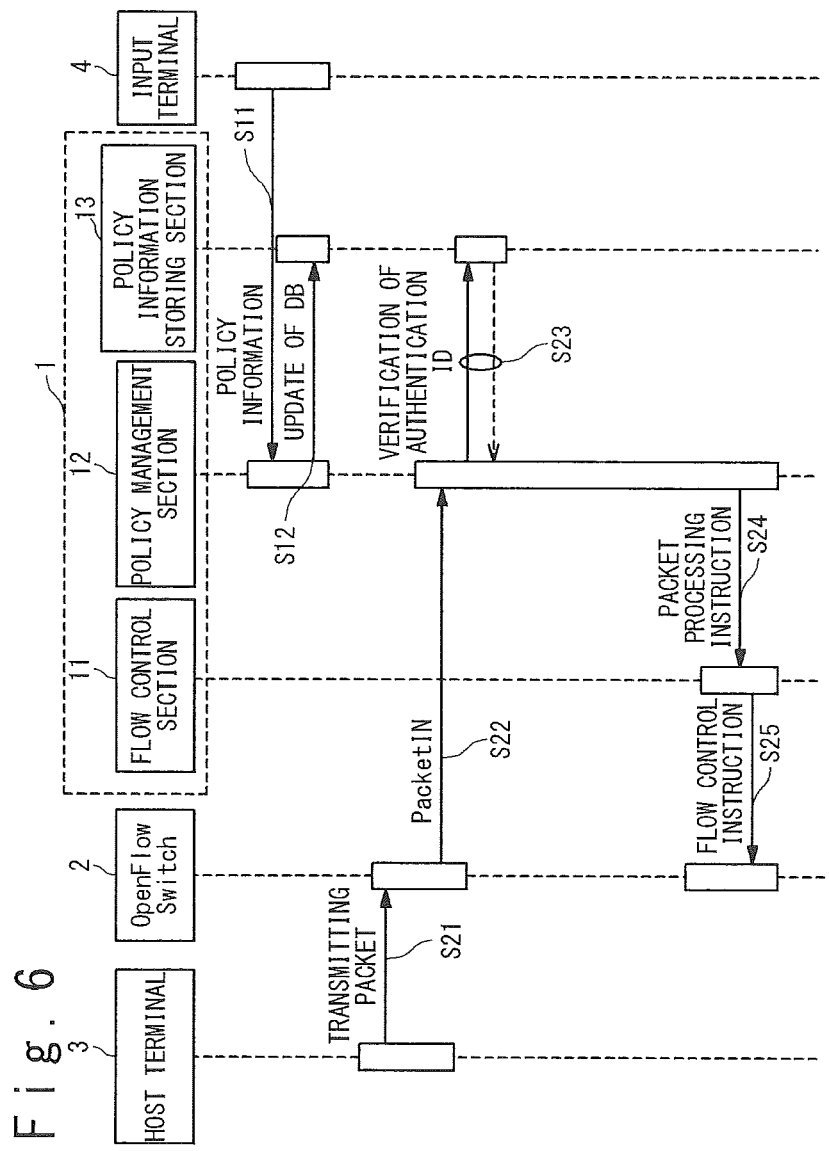

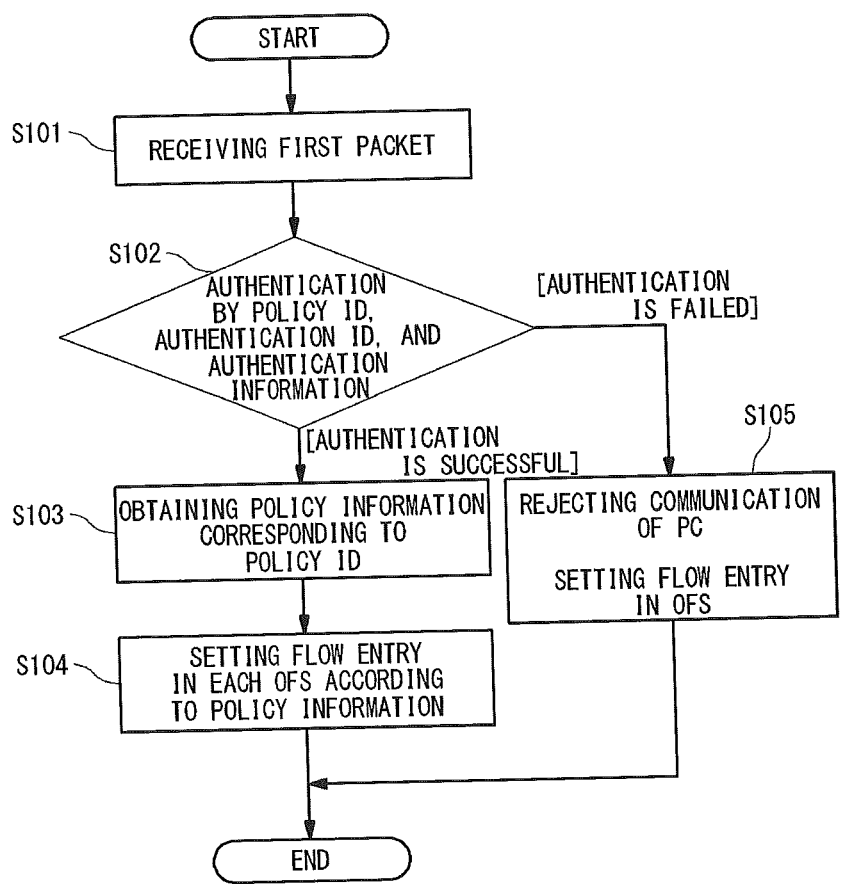

_US 9,065,815 B2_

COMPUTER SYSTEM, CONTROLLER, AND METHOD OF CONTROLLING NETWORK ACCESS POLICY

TECHNICAL FIELD

The present invention relates to a computer system, a controller, a method of controlling a network access policy, and a program, and particularly relates to a computer system and a method of controlling a network access policy, which use an open flow (open flow) technology.

BACKGROUND ART

With a spread of information system using a network, a network such as an IP network is being large-scaled and complicated, and additionally, a high flexibility is being required. Since setting of a network device is being complicated and number of devices to be set is increasing, a burden in a design management for the network is increasing.

For example, as one of widespread access control methods for a personal computer (hereinafter referred to as PCs), a method is known which forms a MAC base VLAN (Virtual Local Area Network) in a terminal L2 switch which is adjacent to the PC to allow only a connection from a PC that has a designated MAC address. In this method, however, in an environment in which hundreds of thousands of PCs are connected, daily maintenances are required for adding or deleting hundreds of thousands of MAC addresses and thousands of L2 switches, and a burden for an administrator is increased.

As a description for solving such a problem, there is an open technology which is proposed by OpenFlow Consortium (http://www.openflowswitch.org/) (refer to non-patent literature 1). In an open flow system according to this technology, a server called as an open flow controller (OFC: Open Flow Controller) is able to integrate, set and manage network switches which are called as open flow switches (OFS Open Flow Switch). Therefore, by setting, in the OFC, a network policy (hereinafter, referred to as a policy) for an overall open flow system, all OFSs are able to be controlled.

With reference to FIG. 1, a configuration and an operation of a computer system which uses an open flow protocol will be explained. With reference to FIG. 1, a computer system according to a related art of the present invention includes an open flow controller 100 (hereinafter, called as OFC 100), a switch group 20 including a plurality of open switches 2-1 to 2-n (hereinafter, called as OFSs 2-1 to 2-n), and a host group 30 including a plurality of host computers 3-1 to 3-i (hereinafter, called as hosts 3-1 to 3-i). Here, n and i are respectively a natural number of 2 or more. In a following explanation, each of the OFSs 2-1 to 2-n is called as an OFS 2 when being not distinguished, and each of the hosts 3-1 to 3-i is as a host 3 when being not distinguished.

The OFC 100 performs setting of a communication path between the hosts 3, and setting of a forwarding operation (a relay operation) or the like for the OFS 2 on the path. In this case, the OFC 100 sets a flow entry in a flow table which is included in the OFS 2, the flow entry associating a rule for identifying a flow (packet data) with an action for defining an operation for the flow. The OFS 2 on the communication path determines a forwarding destination of received packet data in accordance with the flow entry which is set by the OFC 100, and performs a forwarding operation. Thus, the host 3 is able to use a communication path which is set by the OFC 100 to transmit and receive packet data with another host 3. That is, in a computer system using the open flow, since the OFC 100 for setting a communication path and the OFS 2 for performing a forwarding operation are separated, communications in the whole system are able to be collectively controlled and managed.

With reference to FIG. 1, when transmitting a packet to the host 3-i from the host 3-1, the OFS 2-1 references transmitting destination information in the packet which is received from the host 3-1 (header information: for example, destination MAC address or destination IP address), and searches an entry corresponding to this header information in a flow table which is included in the OFS 2-1. For example, contents of the entry set in the flow table are defined in Non-Patent literature 1.

When the entry about the received packet data is not described in the flow table, the OFS 2-1 transfers the packet data (hereinafter, called as a first packet) or header information of the first packet (or first packet itself) to the OFC 100. The OFC 100 which has received the first packet from the OFS 2-1 determines a path 40, based on information such as a source host and a destination host which are included in the packet.

The OFC 100 instructs all OFSs 2 on the path 40 to set flow entries which define transmitting destination of the packet (issue a flow table updating instruction). The OFS 2 on the path 40 updates the flow table managed by itself, in accordance with the flow table updating instruction. After that, the OFS 2 starts transmitting of the packet according to the updated flow table, and the packet is transmitted to the destination host 3-i via the path 40 which is determined by the OFC 100.

However, in the OpenFlow technology described above, the host terminal such as PC (Personal Computer) or the like which is connected with the Open flow system is identified by the IP address or MAC address. Therefore, in an environment where hundreds of thousands of PCs are connected, a policy is required to be set for each of hundreds of thousands of IP addresses or MAC addresses, and a burden is increased. Furthermore, since the IP address and MAC address are able to be faked, there is a risk of an unauthorized access, and a countermeasure is required.

For example, a system about a policy control is described in JP 2005-4549 (refer to patent literature 1). In Patent Literature 1, a policy server is described, which has an access control function for a network device or an application server based on a security policy which is retained by the policy server itself, however, a policy control in a system of an open flow environment is not disclosed.

CITATION LIST

[Patent Literature 1] JP 2005-4549
[Non-Patent literature 1] OpenFlow Switch Specification Version 1.0.0 (Wire Protocol 0x01) Dec. 31, 2009

SUMMARY OF THE INVENTION

From the above, an object of the present invention is to provide a computer system according to an open flow protocol environment, which is able to easily control a network access policy.

Further, another object of the present invention is to increase a degree of security against an unauthorized access in a network according the open flow protocol environment.

In one aspect, a computer system according to the present invention includes a controller, and a switch configured to perform a relay operation for a received packet corresponding to a flow entry which is set by the controller, wherein the relay operation is defined by the flow entry. The switch transmits a received packet which does not correspond to the flow entry set in the switch itself toward the controller. The controller references authentication information included in the received packed to authenticate the received packet. Here, the controller sets a flow entry in the switch, the flow entry defining a relay operation for a packet which includes information which is in header information of the received packet determined to be valid and for identifying a transmitting source of the received packet.

In another aspect, a policy control method according to the present invention includes, a controller receiving, from a switch, a received packet which does not correspond to a flow entry set in the switch, a controller authenticating the received packet by referencing authentication information included in the received packet, and a controller setting, in the switch, a flow entry which defines a relay operation for a packet which includes information which is in header information of the received packet determined to be valid and for identifying a transmitting source of the received packet.

In further another aspect, the above mentioned policy control method preferably realized by a program executed by a computer.

According to the present invention, it is possible to easily perform a network access policy control in a computer system according to the open flow protocol environment.

Further, it is possible to improve a security level against an unauthorized access or interference which uses a spoofed address.

BRIEF DESCRIPTION OF THE DRAWINGS

Objects, advantages, and features of the above mentioned invention will be more apparent from description of embodiments in conjunction with the accompanying drawings in which:

FIG. 4 is a diagram showing a specific example of the policy information according to the present invention;

FIG. 5A is a diagram showing a specific example of a flow entry according to the present invention;

FIG. 5B is a diagram showing a specific example of a flow entry according to the present invention;

FIG. 6 is a sequence diagram showing an example of a communication operation and policy setting in a computer system according to the present invention; and FIG. 7 is a flow diagram showing an example of a policy control operation by an open flow controller according to the present invention.

DESCRIPTION OF EXEMPLARY EMBODIMENTS

Figure 1:
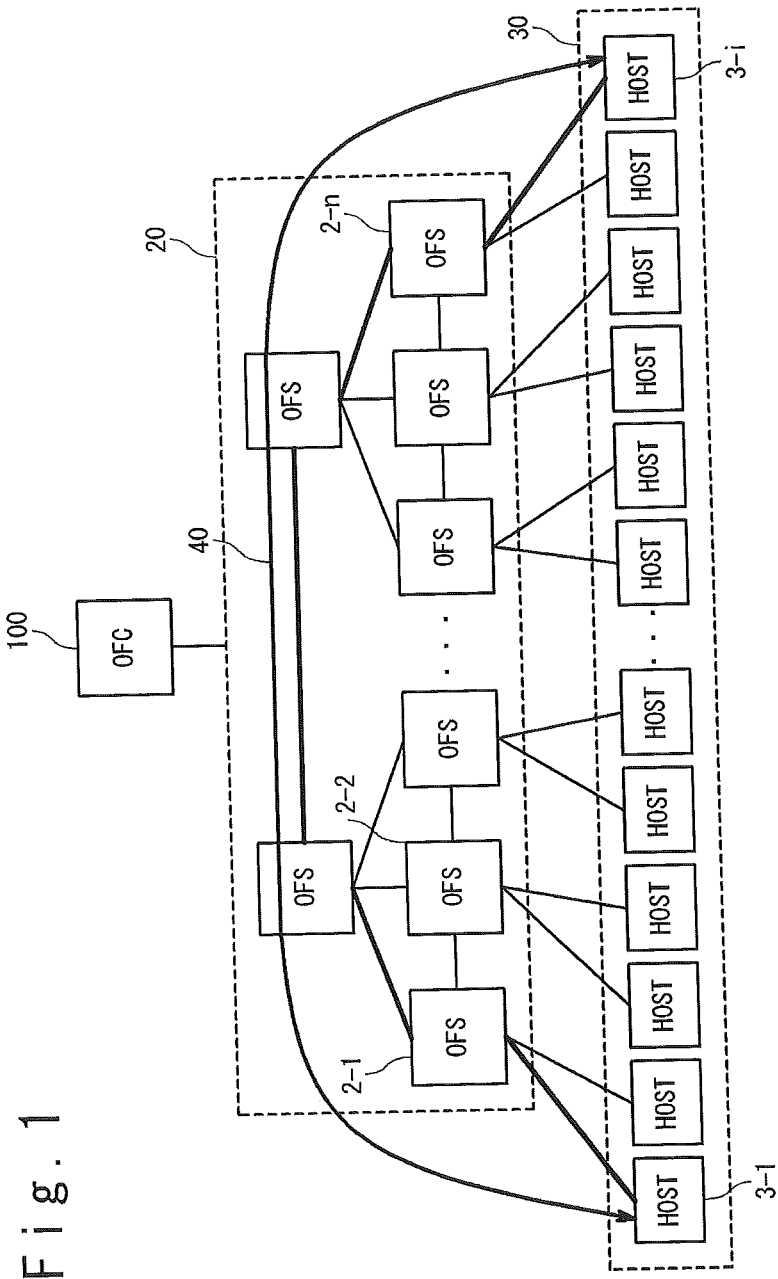
FIG. 1 is a diagram showing one example of a configuration of a computer system using an open flow protocol.

Hereinafter, embodiments of the present invention will be explained with reference to the accompanying drawings. In the drawings, same or similar reference numerals indicate same, similar or equivalent components.

(Configuration of a Computer System)

Figure 2:
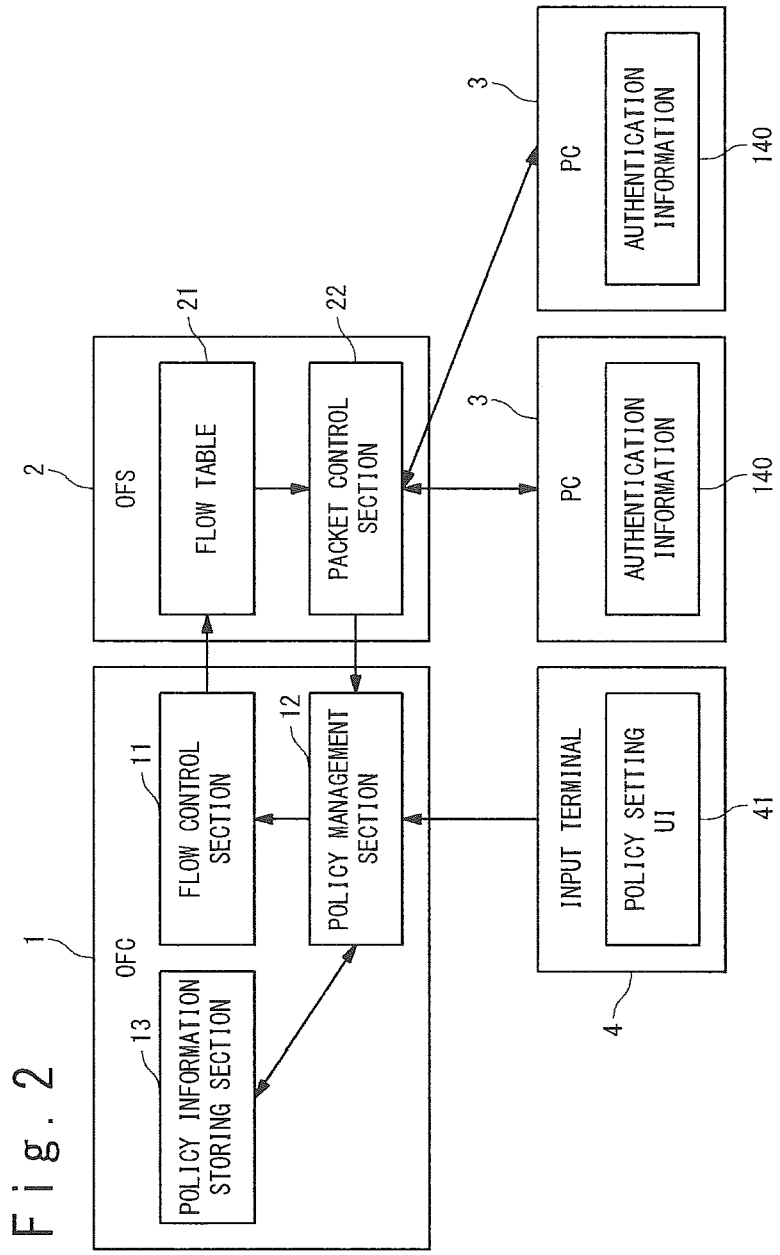
FIG. 2 is a diagram showing one example of a configuration of a computer system according to the present invention.

Like the system shown in FIG. 1, a computer system according to the present invention performs a construction of a communication path and control of transmitting packet data, using an open flow technology. FIG. 2 is a diagram showing one example of a configuration of a computer system according to the present invention. The computer system according to the present invention is different from the system shown in FIG. 1 in configurations of the open flow controller (OFC) and the host terminal (for example, PC), and the other configurations (for example, OFS) are similar to the system shown in FIG. 1.

With reference to FIG. 2, a configuration of a computer system according to a first embodiment of the present invention will be explained. With reference to FIG. 2, the computer system according to the present invention includes an open flow controller 1 (OpenFlow Controller: hereinafter, called as OFC 1), a plurality of open flow switches 2 (Open Flow Switch: hereinafter, called as OFS 2), a plurality of host terminals 3 (for example, PC), and an input terminal 4.

The OFC 1 is connected to a plurality of OFSs 2 via a secure channel network, and updates a flow table 21 of the OFS 2 through the network. Thus, a communication between the plurality of host terminals 3 connected with each other via the OFSs 2 is controlled. The OFS 2 is provided between the plurality of host terminals 3, and relays a packet transmitted from the host terminal 3 or other network (not shown) toward a transmitting destination, according to a flow entry set in the flow table 21.

The OFC 1 controls a construction of a communication path for transmitting packet in the system and a packet transmitting operation, according to the open flow technology. Here, the open flow technology indicates a technology in which the OFC 1 sets path information about a multilayer and a unit flow, in the OFS 2 or OFVS 33 on the communication path, in accordance with a routing policy (flow entry: flow+action) to perform path control or node control (refer to non-patent literature 1 for details). Thus, a path control function is separated from routers and switches, and optimal routing and traffic management can be realized by centralized control of a controller. The OFS 2 and OFVS 33 to which the open flow technology is applied treat a communication as a flow of END2END, rather than in a unit of a packet or a frame like conventional routers and switches.

With reference to FIG. 2, a detailed configuration of the OFC 1 according to the present invention will be explained. The OFC 1 is preferably implemented by a computer having a storage device and a CPU. In the OFC 1, each of functions of a flow control section 11 and a policy management section 12 is realized by a computer (not shown) executing a program stored in a storage device.

The flow control section 11 performs setting or deleting of a flow entry (Rule+Action) in a switch (here, OFS 2) according to the open flow protocol. Thus, the OFS 2 executes an action (for example, relay or cancel of the packet) related to a rule in accordance with header information of the received packet.

In the rule set in the flow entry, for example, a combination of addresses and identifiers about Layer 1 to Layer 4 of OSI (Open Systems Interconnection) reference model is defined, which is included in header information of packet data of TCP/IP. For example, as the rule, respective combinations of a physical port of Layer 1, a MAC address of Layer 2, a VLAN tag (VLAN id), an IP address of Layer 3, and a port number of Layer 4 are set. In the VLAN tag, a priority (VLAN Priority) may be added.

Here, the identifier or address or the like to be set in the rule by the flow control section 11 may be set as a predetermined range. Further, preferably, addresses of a destination and a source or the like are distinguished to be set as the rule. For example, as the rule, a range of a MAC destination address, a range of a destination port number for identifying a connection destination application, and a range of a source port number for identifying connection source application are set. Moreover, as the rule, an identifier for identifying a data transmitting protocol may be set.

As the action set in the flow entry, for example, a method for processing packet data of TCP/IP is defined. For example, information indicating whether or not received packet data is relayed, and a transmitting destination in a case of relaying are set. Moreover, as the action, information indicating copy or cancel of the packet data may be set.

The flow control section 11 according to the present invention sets a flow entry according to an instruction from the policy management section 12, in the OFS 2 which is designated by the instruction.

Figure 3:
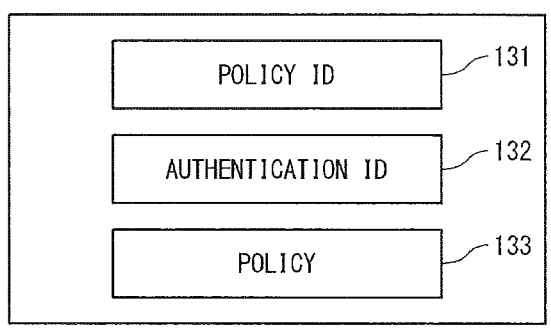
FIG. 3 is a diagram showing one example of policy information according to the present invention.

The policy management section 12 transforms policy information 130 supplied from the input terminal 4 into a format which is easily searched, and records it in a policy information storing section 13. FIG. 3 is a diagram indicating a configuration of the policy information 130 recorded in the policy information storing section 13. With reference to FIG. 3, in the policy information storing section 13, a policy ID 131, an authentication ID 132, and a policy 133 are associated to be recorded as the policy information 130.

The policy ID 131 is an identifier for uniquely identifying the policy information 130. The authentication ID 132 is information (for example, password) for authenticating whether or not the policy 133 is applied to a first packet (a source host or destination host of the first packet). The policy 133 is information for defining a network access policy for the host terminal 3. In the policy 133, conditions for defining a source host or destination host, a protocol for defining an access method, and a priority or the like are defined.

FIG. 4 is a diagram showing a specific example of the policy information 130. In the policy information 130, as the policy ID 131, a policy identifier "policy for general staff of accounting division" is set, which identifies a terminal which is an application target of a plurality of policies 133 "policy 1 to policy 3, . . . ", and an authentication ID 132 "XXXXX" which is used for authenticating whether or not the policies 133 are applied is set. Here, the policy 1 indicates that forwarding a packet toward an IP address of 10.11.12.1 using HTTP (Hypertext Transfer Protocol) is allowed, and that its priority is "10". The policy 2 indicates that forwarding a packet toward an IP address of 10.11.12.2 using FTP (File Transfer Protocol) is allowed, and that its priority is "20". The policy 3 indicates that a connection from an IP address of 10.11.12.0/24 using RDP (Remote Desktop Protocol) is allowed, and that its priority is "30".

The policy management section 12 checks authentication information 140 included in the first packet which is notified from the OFS 2, with the policy information 130 recorded in the policy information storing section 13 to authenticate the first packet.

Specifically, the host terminal 3 adds the authentication information 140 including the policy ID in a data region of a packet to transmit it to a destination host. The policy management section 12 searches the policy information storing section 13 by a key which is the policy ID of the authentication information 140 which is included in the first packet notified from the OFS 2, and extracts the policy information 130 having a policy ID 131 that corresponds to the policy ID of the authentication information 140. Then, the policy management section 12 authenticates the first packet by checking the authentication ID of the authentication information 140 with the authentication ID 132 in the policy information 130.

When the first packet is valid (authentication ID matches), the policy management section 12 instructs the flow control section 11 to set a flow entry for forwarding the first packet. In this case, the flow control section 11 sets a flow entry which complies with the policy 133 which corresponds to the header information of the first packet, in the OFS 2 on a communication path which is calculated based on the header information.

On the other hand, in a case where the policy ID 131 corresponding to the policy ID included in the first packet is not recorded in the policy information storing section 13 or a case where the authentication information ID is not matched, the policy management section 12 determines that the authentication is failed. In this case, the policy management section 12 instructs the flow control section 11 to set a flow entry for discarding the first packet. In response to the instruction, the flow control section 11 sets a flow entry in a OFS 2 which is a notification source of the first packet so that the flow entry includes a rule being at least a part of the header information of the first packet and an action for discarding a packet. A method of selecting an OFS 2 which is a setting target of the flow entry, a method of calculating a communication path, and a method of setting and managing the flow entry by the flow control section 11 are performed in accordance with the open flow protocol described in Non-patent literature 1.

FIG. 5A and FIG. 5B indicate one example of the flow entry set in a switch in a case where (a first packet from) a terminal A is succeeded in the authentication by the policy management section 12 and the policy 1 shown in FIG. 4 is applied. Here, a flow entry will be explained, which is set in an OFS 2 in which a port 0/1 is connected with the terminal A and a port 0/2 is connected with a Web server.

With reference to FIG. 5A and FIG. 5B, in the flow entry, as a rule 211, a match field and a value of the match field (Match Value) are defined. Moreover, as action information 212, an action and a priority are defined. In the policy 1, "HTTP connection to 10.11.12.1 is allowed, and priority is 10" is defined. In the OFS 2, a flow entry (FIG. 5A) is set for defining a relay operation about a packet which is destined for the IP address "10.11.12.1" from an authenticated terminal A, and a flow entry (FIG. 5B) is set for defining a relay operation about a packet which is destined for the authenticated terminal A from a Web server to which the IP address "10.11.12.1" is assigned.

With reference to FIG. 5A, in the rule 211, "0/1" is defined as an input port, "MAC address of terminal A" is defined as a source MAC address, "VLAN ID of terminal A" is defined as an input VLAN ID, "0x0800(IPv4)" is defined as Ether Type, "6(TCP)" is defined as an IP protocol (protocol number), "IP address of terminal A" is defined as a source IP address, "10.11.12.1" is defined as a destination IP address, "80(HTTP)" is defined as a destination port number, and "any" is defined in the other match fields. Moreover, in the action information 212, "output received packet to a port "0/2" and its priority "10"" are defined.

In accordance with the flow entry shown in FIG. 5A, the OFS 2 outputs a packet, which is transmitted from the authenticated terminal A by HTTP communication and is destined for the IP address "10.11.12.1", to a port "0/2" which is connected to the Web server.

Further, with reference to FIG. 5B, in the rule 211, "0/2" is defined as the input port, "MAC address of terminal A" is defined as the destination MAC address, "0x0800(IPv4)" is defined as Ether Type, "6(TCP)" is defined as the IP protocol (protocol number), "10.11.12.1" is defined as the source IP address, "IP address of terminal A" is defined as the destination IP address, "80(HTTP)" is defined as the destination port number, and "ANY" is defined in the other match fields. Moreover, in the action information 212, "output received packet to the port "0/1"" and "its priority is "10"" are defined.

In accordance with the flow entry shown in FIG. 5B, the OFS 2 outputs a packet, which is transmitted from the Web server of the IP address "10.11.12.1" by HTTP communication and is destined for the IP address "IP address of terminal A", to the port "0/1" which is connected to the terminal A.

As mentioned above, according to the present invention, a flow entry according to a policy corresponding to an authenticated first packet (host terminal 3) is set in the OFS 2. In one example mentioned above, setting of the flow entry for the policy 1 was explained, however, when there are plurality of policies to be authenticated, flow entries are set respectively.

The OFS 2 includes a flow table 21 in which the flow entry is set by the OFC 1, and a packet control section 22 forwards or discards the received packet in accordance with the flow entry set in the flow table 21. The flow entry for the OFS 2 is set based on a Flow-mod request from the OFC 1, like a conventional way. When there is no flow entry (rule) corresponding to the header information of the received packet in the flow table 21, the packet control section 22 forwards the received packet to the OFC 1 as the first packet. Thus the OFS 2 sends the authentication information 140 transmitted from the host terminal 3 to the OFC 1. On the other hand, when there is a flow entry corresponding to the header information of the received packet, the packet control section 22 processes the packet in accordance with the action of the flow entry. As the action for the received packet, forwarding to another OFS 2 or the terminal 3, or discarding the packet is exemplified. Though only an end switch connected to the two host terminals 3 is indicated in FIG. 2, it goes without saying that the host terminal 3 is connected with another host terminal 3 via other OFSs 2 as indicated in FIG. 1. Moreover, the OFS 2 is preferably a physical switch, but may be realized by a virtual switch as long as operates in accordance with the open flow protocol.

The host terminal 3 is preferably realized by a computer device (Physical server) having a CPU (not shown) and RAM, and includes a storage device (not shown) in which the authentication information 140 is recorded. Alternatively, the host terminal 3 may be realized by a virtual machine. The host terminal 3 adds the authentication information 140 in a data region of the packet to be transmitted. The other configurations are similar to a conventional computer system or virtual machine which is able to perform a packet communication. Though only two host terminals 3 are indicated in FIG. 2, it goes without saying that the present system includes other host terminals 3 which are connected with each other via a plurality of OFSs 2 as shown in FIG. 1.

Though only one host terminal 3 is provided in the system in FIG. 2, generally, a plurality of host terminals 3 are provided.

The input terminal 4 is a computer device having a policy setting UI (User Interface) 41. The policy setting UI 41 is a user interface for setting the policy information in the OFC 1, and outputs an instruction from a user to the policy management section 12 of the OFC 1. Thus, arbitrary policy information 130 is set in the OFC 1. The setting method of the policy information 130 is not limited to this, and the policy information 130 may be set by using a mobile storage medium.

Moreover, an output device such as a monitor or printer may be connected to the OFC 1. The policy management section 12 is able to identify a source OFS 2 or destination host terminal 3 of the packet, based on the header information (source port number or source MAC address) of the first packet which is failed in the authentication. By visually outputting this identification result via the output device, not only monitoring of an unauthorized access but also identification of a source of the unauthorized access is possible.

According to the above mentioned configuration, in the computer system according to the present invention, the authentication for the packet (access) is performed on the controller side with using the first packet which conforms to the open flow protocol, and forwarding operation for the packet is controlled based on the authentication result. According to the present invention, since the authentication information inserted in the packet by the host terminal 3 is authenticated by the OFC 1 which controls a flow, the OFC 1 is able to intensively control communications from the host terminals 3 having different network access policies. Moreover, in the present invention, the host terminal 3 to which the policy 133 is applied is able to be identified by the authentication ID 132 which is given for each policy information 130. Therefore, the policy is easily changed and managed, without setting the policy for each of IP addresses and MAC addresses. Further, since the OFC 1 according to the present invention controls an access by a packet authentication using the first packet, an unauthorized access (for example: intrusion of a packet with a faked address) is be able to be blocked at an end OFS 2 of a host side that is an entry of the network.

(Operation)

Next, with reference to FIG. 6 and FIG. 7, a communication operation and an access control operation of the computer system according to the present invention will be explained in detail.

FIG. 6 is a sequence diagram showing one example of a policy setting and communication operation in a computer system according to the present invention. FIG. 7 is a flow diagram showing one example of a policy control operation by the OFC 1 according to the present invention.

With reference to FIG. 6, firstly, when the computer system starts up, the policy information 130 is previously recorded in the policy information storing section 13 of the OFC 1 from the input terminal 4 (step S11, S12). Specifically, the policy information 130 inputted via the input terminal 4 is supplied to the policy management section 12 to be recorded in the policy information storing section 13 as a database. Thus, the policy information storing section 13 is updated by latest policy information 130. Here, the policy information storing section 13 is able to be always searched by the policy management section 12. Moreover, the update of the policy information storing section 13 at Step S11 and S12 may be performed during an operation of the system.

Subsequently, an access control and communication operation will be explained, in a case where a packet is transmitted from the host terminal 3 to the system. The host terminal 3 transmits a packet to the network, the packet including authentication information 140 in which an encrypted policy ID and an authentication ID are added (step S21). In this case, the packet from the host terminal 3 is transferred to the OFS 2.

The OFS 2 determines whether or not the header information of the packet received from the host terminal 3 complies with (corresponds to) the rule of the flow entry set in the flow table 21, and processes the received packet (for example, forwarding to another OFS 2 or discarding) in accordance with the action related to the rule when there is a matching rule (not shown). Specifically, the OFS 2 extracts the header information (sending and receiving IP address, MAC address, port number, or protocol or the like) of the packet received from the host terminal 3. Then the OFS 2 compared the header information and the flow table 21 to confirm whether or not there is a matching flow entry. When there is the matching flow entry, the OFS 2 performs an action (forwarding or discarding) described in the flow entry, and completes the forwarding operation.

On the other hand, when (a rule in) a flow entry which complies with (corresponds to) the header information of the received packet is not set in the flow table 21, the OFS 2 informs the policy management section 12 in the OFC 1 of the received packet as the first packet (Step S22, PacketIN).

After the PacketIN, the policy management section 12 authenticates the first packet, and instructs the flow control section 11 a packet processing method according to the authentication result (steps S23, S24). The flow control section 11 sets a flow entry according to the instruction from the policy management section 12, in a flow table 21 of the OFS 2 that is a target to be controlled (Step S25). Thus, the OFS 2 processes the packet received at Step S21 in accordance with the flow entry which is newly set in the flow table 21.

With reference to FIG. 7, an operation of the policy management section 12 which has received the first packet (Step S23 to S25 in FIG. 6) will be explained in detail.

The OFC 1 analyzes a data region of the first packet received from the OFS 2 to obtain authentication information 140 (policy ID and authentication ID) (Step S101). Subsequently, the OFC 1 compares the obtained authentication information 140 (policy ID and authentication ID) with policy information 130 recorded in the policy information storing section 13 to perform authentication (Step S102). Specifically, the policy management section 12 searches policy information 130 corresponding to the authentication information 140 (policy ID and authentication ID) in the policy information storing section 13. At this time, if the policy information 130 corresponding to the authentication information 140 is recorded in the policy information storing section 13, the policy management section 12 determines that authentication is successful, and if it is not recorded, the authentication is determined to be failure (Step S102).

At step S102, when the authentication is successful, the policy management section 12 obtains, from the policy information storing section 13, policy information 130 corresponding to the policy ID included in the authentication information 140 (Step S103). The OFC 1 sets a flow entry corresponding to the obtained policy information 130 in an OFS 2 which is a control target (Step S104).

Specifically, the policy management section 12 references policy information 130 corresponding to the authentication information 140 that authentication is successful, and instructs the flow control section 11 to set a flow entry based on a policy 133 which corresponds to the header information of the first packet. In this case, as is the case with a conventional open flow system, a communication path is calculated, and OFSs 2 that are setting targets of the flow entry are determined. By a Flow-mod request via the secure channel, the flow control section 11 sets, in the determined OFSs 2, flow entries based on an instruction from the policy management section 12. In this case, a rule including a source MAC address and an action corresponding to the policy 133 are preferably set. Thus, a communication by a host of which packet is authenticated by the OFC 1 (namely, an authenticated host terminal) is controlled based on the policy which is previously set in the OFC 1. Moreover, as a rule set in the flow entry, a destination address or a destination port number may be defined in addition to the source MAC address. Thus, a control based on an access destination of the authenticated host terminal is realized.

As a specific example, setting of a flow entry will be explained, in a case where the policy management section 12 obtains the policy information 130 shown in FIG. 4 in response to the authentication information 140, and a source MAC address "0000.0000.0001", destination IP address "10.11.12.1", and protocol "HTTP" are included in the header information of the first packet. In this case, the policy management section 12 instructs to set a flow entry corresponding to the policy 1 shown in FIG. 4. Thus, the flow control section 11 sets a flow entry in the OFS 2 on the communication path, wherein in the flow entry, a rule includes a policy management source MAC address of "0000.0000.0001", a destination IP address of "10.11.12.1", and a protocol of "HTTP", and an action of the flow entry is for forwarding a packet to a port connected to "10.11.12.1". Further, the flow control section 11 sets "10" as the priority for applying this flow entry in the OFS 2.

After that, the OFS 2 in which the flow table 21 is updated performs packet control in accordance with this flow table.

On the other hand, at step S102, if the authentication is failed, the OFC 1 sets a flow entry in a flow table 21 of the OFS 2 which is a notification source of the first packet, the flow entry defining at least a part of the header information of the first packet as a rule, and discard of a packet as an action (Step S105). Here, a flow entry is preferably set, in which the rule includes a source MAC address and the action is discard of packet. By this, a communication by a source host of which packet is not authenticated by the OFC 1 (namely, unauthenticated host terminal) is blocked at an OFS 2 which is an entry of the network. Moreover, as a rule of the flow entry for defining discard of the packet, a destination address or a destination port number may be defined in addition to the source MAC address. By this, with respect to each of access destinations of unauthenticated host terminal, an access is able to be limited.

As mentioned above, the OFC 1 according to the present invention receives the authentication information 140 from the host terminal 3 via a notification of the first packet to authenticate it, and sets a flow entry, in which the rule indicates a source is this host terminal and the action is defined based on the policy. Therefore, in the system according to the present invention, a policy is able to be controlled for each of terminals, by previously adding authentication information 140 in the host terminal 3 to which the policy is applied. That is, in the present invention, it is not necessary to prepare config (policy information) for applying a policy for each of host terminals. For example, though config is required for tens of thousands of devices in order to design flexible policy control in a network in which tens of thousands of PCs are connected, in the present invention, a design operation is easily performed since config for each of PCs is not necessary.

Moreover, in the present invention, authentication using the authentication information is performed in an initial connection to the network from the host terminal 3. Therefore, it is possible to block unauthorized access with a spoofed IP address or MAC address at an initial access stage, and a security level of the open flow system can be increased.

In addition, the OFS used in the computer system according to the present invention is only needed to conform to the conventional open flow protocol (for example, a protocol defined by the OpenFlow Switch Specification version 1.0), and a control for a network policy or a prevention of an unauthorized access can be realized by changing only functions of the OFC or host terminal, as embodiments mentioned above. That is, according to the present invention, in the existing open flow system, by changing only functions of the OFC and the host terminal, above mentioned control for network policy or prevention of unauthorized access can be realized. Therefore, at low cost and easily, functions such as control for network policy can be added in the existing system.

As mentioned above, embodiments of the present invention has been explained in detail, however, a specific configuration is not limited to the above mentioned embodiments, and the present invention may also include a configuration modified within a range without departing from a spirit of the present invention. In above explanation, one example has been explained in which the source MAC address is included in the rule of the flow entry which is set after the authentication, however, the present invention is not limited to this as long as a source host terminal is identified. For example, as the rule, a source IP address or a port number connected to the source host terminal may be defined.

This application is based upon Japanese patent application No. 2011-91105, and the disclosure of which is incorporated herein in by reference.

The invention claimed is:

1. A computer system comprising:
a controller; and
a switch configured to perform a relay operation for a received packet conforming to a flow entry set by the controller, the relay operation being defined by the flow entry,
wherein the switch is configured to transmit, to the controller, the received packet not conforming to the flow entry set in the switch,
wherein the controller is configured to reference authentication information included in the received packet to authenticate the received packet, and set, in the switch, the flow entry for defining the relay operation for a packet which includes information which is in header information of the received packet determined to be valid and for identifying a source of the received packet,
wherein the controller comprises a storage device in which policy information for defining a relay operation policy is recorded, and is configured to set, in the switch, the flow entry which conforms to the policy information corresponding to authentication information included in the received packet determined to be valid,
wherein the authentication information includes a policy ID for identifying the policy information, and a first authentication ID used in authentication,
wherein the policy information is recorded in the storage device, relating the policy ID for identifying the policy information with a second authentication ID, and
wherein the controller is configured to determine the received packet, in which the second authentication ID related to the policy ID included in the authentication information corresponds to the first authentication ID, to be a valid received packet.

2. The computer system according to claim 1, wherein the controller is configured to reference the authentication information to authenticate the received packet, and set, in the switch, the flow entry for defining discard of a packet which includes information which is in header information of the received packet determined to be incorrect and for identifying a source of the received packet.

3. The computer system according to claim 1, wherein the policy information includes a plurality of policies related to the policy ID for identifying the policy information, and
wherein the controller is configured to extract, from the storage device, a policy which conforms to header information of the received packet determined to be valid, in the plurality of policies related to the policy ID included in the authentication information, and set the flow entry which conforms to the extracted policy, in the switch.

4. The computer system according to claim 1, wherein the first authentication ID, the second authentication ID, and information to define an action are provided in a header of the received packet, separately.

5. The computer system according to claim 4, wherein authentication is performed based on the policy information.

6. A method of controlling a policy, comprising:
receiving from a switch, by a controller, a received packet which does not conform to a flow entry set in the switch;
authenticating the received packet, by the controller referencing authentication information included in the received packet;
setting in the switch, by the controller, the flow entry which defines a relay operation for a packet which includes information which is in header information of the received packet determined to be valid and for identifying a source of the received packet; and
retaining, by the controller, policy information for defining a relay operation policy, and
wherein the setting the flow entry which defines the relay operation comprises:
setting in the switch, by the controller, the flow entry which conforms to policy information corresponding to authentication information included in the received packet determined to be valid,
wherein the authentication information includes a policy ID for identifying the policy information, and a first authentication ID used in authentication,
wherein the policy information is retained by the controller, relating the policy ID for identifying the policy information with a second authentication ID, and
wherein in the authenticating, the controller determines the received packet, in which the second authentication ID related to the policy ID included in the authentication information corresponds to the first authentication ID, to be a valid received packet.

7. The method according to claim 6, further comprising:
setting in the switch, by the controller, the flow entry which defines discard of a packet which includes information which is in header information of the received packet determined to be incorrect and for identifying a source of the received packet.

8. The method according to claim 6, wherein the policy information includes a plurality of policies related to the policy ID for identifying the policy information, and
wherein the setting the flow entry which defines the relay operation comprises:
extracting, by the controller, from the storage device, a policy which conforms to header information of the received packet determined to be valid, in the plurality of policies related to the policy ID included in the authentication information; and
setting, by the controller, the flow entry which conforms to the extracted policy, in the switch.

9. A tangible computer-readable non-transitory recording medium in which a computer-executable program code is stored to attain a method, which comprises:
receiving from a switch, by a controller, a received packet which does not conform to a flow entry set in the switch;
authenticating the received packet, by the controller referencing authentication information included in the received packet;
setting in the switch, by the controller, the flow entry which defines a relay operation for a packet which includes information which is in header information of the received packet determined to be valid and for identifying a source of the received packet; and retaining, by the controller, policy information for defining a relay operation policy, and wherein the setting the flow entry which defines the relay operation comprises:

setting in the switch, by the controller, the flow entry which conforms to policy information corresponding to authentication information included in the received packet determined to be valid, wherein the authentication information includes a policy ID for identifying the policy information, and a first authentication ID used in authentication, wherein the policy information is retained by the controller, relating the policy ID for identifying the policy information with a second authentication ID, and wherein in the authenticating, the controller determines the received packet, in which the second authentication ID related to the policy ID included in the authentication information corresponds to the first authentication ID, to be a valid received packet.

* * * * *